(12) United States Patent
Yamagami

(10) Patent No.: US 6,848,615 B2
(45) Date of Patent: Feb. 1, 2005

(54) CARD PAYMENT METHOD AND CARD PAYMENT SYSTEM FOR DOOR-TO-DOOR DELIVERY

(75) Inventor: Takayuki Yamagami, Kyoto (JP)

(73) Assignees: Sagawa Express Co., Ltd., Kyoto (JP); JCB Co., Ltd., Tokyo (JP)

( * ) Notice: Subject to any disclaimer, the term of this patent is extended or adjusted under 35 U.S.C. 154(b) by 0 days.

(21) Appl. No.: 10/362,588

(22) PCT Filed: Aug. 23, 2001

(86) PCT No.: PCT/JP01/07224

§ 371 (c)(1),
(2), (4) Date: Feb. 24, 2003

(87) PCT Pub. No.: WO02/17174

PCT Pub. Date: Feb. 28, 2002

(65) Prior Publication Data

US 2003/0173401 A1 Sep. 18, 2003

(30) Foreign Application Priority Data

Aug. 24, 2000 (JP) ........................ 2000-254155

(51) Int. Cl.[7] .............................................. G06K 15/00
(52) U.S. Cl. ..................... 235/383; 235/379; 235/380
(58) Field of Search ................................ 235/383, 379, 235/380, 472.01–472.03; 705/35–45

(56) References Cited

U.S. PATENT DOCUMENTS

| | | | | |
|---|---|---|---|---|
| 5,053,606 A | * | 10/1991 | Kimizu ........................ 235/379 |
| 5,208,446 A | * | 5/1993 | Martinez ..................... 235/380 |
| 5,489,773 A | | 2/1996 | Kumar |
| 5,602,377 A | * | 2/1997 | Beller et al. ............ 235/462.15 |
| 5,748,908 A | * | 5/1998 | Yu ............................... 705/44 |
| 5,933,288 A | * | 8/1999 | Plesko ......................... 359/896 |

| | | | |
|---|---|---|---|
| 6,193,155 B1 | * | 2/2001 | Walker et al. .............. 235/381 |
| 6,450,407 B1 | * | 9/2002 | Freeman et al. ............ 235/492 |

FOREIGN PATENT DOCUMENTS

| | | |
|---|---|---|
| EP | 0 359 667 A1 | 3/1990 |
| JP | 05-204956 | 8/1993 |
| JP | 5-204956 | 8/1993 |
| JP | 07-093411 | 4/1995 |
| JP | 8-181798 | 7/1996 |
| JP | 10-69580 | 3/1998 |
| JP | 10-105614 | 4/1998 |
| WO | WO 97/41499 | 11/1997 |

OTHER PUBLICATIONS

Yuki Inagaki: "Kihon kara jissen made; business seikou no tameno kanpeki guide; how to e–commerce (kakusha haisou system no hikaku bunseki kara saishin service made; haisou service wo kurabete erande tsukaikonasu)" E–Commerce Super Manual, pp. 56–63, Jun. 23, 2000.

* cited by examiner

Primary Examiner—Michael G. Lee
Assistant Examiner—Seung H Lee
(74) Attorney, Agent, or Firm—Oblon, Spivak, McClelland, Maier & Neustadt, P.C.

(57) ABSTRACT

A home delivery contractor 10 enters into an affiliation contract with a credit card company 12 and also enters into a merchandise price collection consignment contract with a merchandise seller 14. If a consumer 16 orders merchandise 18 with the merchandise seller 14 on the Internet, then the merchandise seller 14 makes a request to the home delivery contractor 10 for home delivery. Upon receipt of the delivered merchandise 18, the consumer 16 passes to the home delivery contractor 10 a credit card 20 of the credit card company 12 who has entered into the affiliation contract with the home delivery contractor 10, whereby the home delivery contractor 10 settles the price for the merchandise 18 with a portable card reader device 22.

14 Claims, 9 Drawing Sheets

| NO. | TRANSACTION INFORMATION | CARD INFORMATION | TERMINAL INFORMATION |
|---|---|---|---|
| 1 | TRACKING NUMBER<br>MONEY AMOUNT FOR MERCHANDISE<br>MERCHANDISE CLASSIFICATION | CREDIT CARD COMPANY INFORMATION<br>CREDIT CARD NUMBER CONFIRMATION INFORMATION | TERMINAL IDENTIFICATION NUMBER |
| | | | |

| NO. | TRANSACTION INFORMATION | CARD INFORMATION | TERMINAL INFORMATION | ACCOUNT INFORMATION |
|---|---|---|---|---|
| 1 | TRACKING NUMBER<br><br>MONEY AMOUNT FOR MERCHANDISE<br><br>MERCHANDISE CLASSIFICATION | CREDIT CARD COMPANY INFORMATION | TERMINAL IDENTIFICATION NUMBER | TRANSACTION CONTENT<br><br>DEPOSITED AMOUNT |
|  |  |  |  |  |
|  |  |  |  |  |

CARD PAYMENT METHOD AND CARD PAYMENT SYSTEM FOR DOOR-TO-DOOR DELIVERY

TECHNICAL FIELD

This invention relates to a pay-by-card method of a home delivery service and to a pay-by-card system, which can settle a price for merchandise with a card when a home delivery contractor delivers this merchandise to a consumer who ordered the merchandise.

BACKGROUND ART

Along with development of home delivery services and the rapid development of communication means such as the Internet, there is a growing form of purchasing merchandise in which merchandise ordered by a consumer through the Internet and the like is delivered to the consumer by a home delivery service.

Incidentally, regarding payment of the price for the merchandise delivered by the home delivery service, the consumer would pay to a home delivery contractor by cash on the doorstep or would pay through a credit card company with which a seller is affiliated.

However, on the part of the consumer, there may be the case where the consumer does not have the cash for the merchandise price. Meanwhile, on the part of the home delivery contractor, procedures become complicated when there is change involved, and management of the received cash and management of the change are also required.

Meanwhile, in the case of shopping at an Internet shopping mall established on the Internet, for example, when there is merchandise in a shop opened in the Internet shopping mall that the consumer wishes to order, the consumer places an order for the relevant merchandise on a screen of a personal computer (hereinafter referred to as a "PC"). Then, there appears a select screen for selecting either credit card settlement or cash-on-delivery settlement as a method of settling the price for the merchandise. If the consumer wishes the credit card settlement, the consumer selects the credit card settlement, and a screen appears for directing an input of a credit card number and for directing selection of a home delivery contractor who delivers the merchandise to the home of the consumer.

Thereafter, the consumer transmits through a network a credit card number of a credit card company or a money card number and a personal identification number of a financial institution, which the seller is affiliated with. As a result, the settlement is completed through the credit card company or the financial institution.

However, since important personal information such as a credit card number, a money card number and a personal identification number passes through the network or the seller, concern of information leakage arises.

DISCLOSURE OF THE INVENTION

The present invention has been made in consideration of the foregoing problem, and an object thereof is to provide a pay-by-card method and a pay-by-card system for a home delivery service, which are capable of settling with a card the price for merchandise delivered by a home delivery service and that is able to settle with a plurality of different cards, and also capable of preventing leakage of important personal information.

The gist of the present invention includes a settling method for performing settlement of merchandise by exchanging information through a wireless communication line between a server of a settling organization and a portable card reader device carried by a home delivery contractor who delivers the merchandise to a consumer who ordered the merchandise, in which the portable card reader device reads information out of a settlement card for use in settlement by the consumer upon delivery of the merchandise to the consumer, transmits the contents thus read out to the server of the settling organization which performs settlement through the wireless communication line, and settles a price for the merchandise upon receipt of a result of a credit inquiry regarding the settlement card from the server of the settling organization.

Moreover, the gist includes a settling method for performing settlement of merchandise by exchanging information through a wireless communication line between a server of a settling organization and a portable card reader device carried by a home delivery contractor who delivers the merchandise to a consumer who ordered the merchandise, in which the card reader device reads information out of a card issued by the settling organization, and transmits the information on this settlement card and information on a price for the merchandise to the server of the settling organization through the wireless communication line; meanwhile, the server of the settling organization receives the information on the settlement card and the information on the price for the merchandise from the portable card reader device through the wireless communication line, performs a credit inquiry concerning the consumer based on the received information on the settlement card and information for judging validity of the given settlement card, settles the price for the merchandise in accordance with a result of this credit inquiry and received information on the price for the merchandise, and transmits the result of this credit inquiry to the portable card reader device through the wireless communication line; and meanwhile, the portable card reader device receives the result of the credit inquiry from the server of the settling organization through the wireless communication line, and issues a receipt based on the received result of the credit inquiry and the information on the price for the merchandise.

Moreover, the gist includes the method in which the server of the settling organization transfers a money amount calculated by deducting a commission concerning settlement from the price for the merchandise to a server of a financial institution which performs settlement on behalf of the home delivery contractor.

Moreover, the gist includes the method in which the server of the financial institution performing the settlement on behalf of the home delivery contractor transfers a money amount calculated by deducting commission concerning home delivery from the money amount transferred from the server of the settling organization to a server of a financial institution which performs settlement on behalf of a seller.

Moreover, the gist includes the method in which the server of the settling organization deletes the information of the settlement card being received from the portable card reader device after obtaining the result of the credit inquiry.

Moreover, the gist includes the method in which the portable card reader device deletes the information of the settlement card of the consumer after obtaining the result of the credit inquiry.

Moreover, the gist includes the method in which the settling organization is any of a credit card company and a financial institution, and the settlement card is any of a credit card issued by the credit card company and a debit card issued by the financial institution.

Moreover, the gist includes a settling system for performing settlement of merchandise by exchanging information through a wireless communication line between a server of a settling organization and a portable card reader device carried by a home delivery contractor who delivers the merchandise to a consumer who ordered the merchandise, in which the portable card reader device includes reading means for reading information out of a settlement card for use in settlement by the consumer upon delivery of the merchandise to the consumer, transmitting means for transmitting the contents thus read out to the server of the settling organization which performs settlement through the wireless communication line, and receiving means for receiving a result of a credit inquiry regarding the settlement card from the server of the settling organization; and in which the portable card reader device settles a price for the merchandise upon receipt of the result of this credit inquiry.

Moreover, the gist includes a settling system for performing settlement of merchandise by exchanging information through a wireless communication line between a server of a settling organization and a portable card reader device carried by a home delivery contractor who delivers the merchandise to a consumer who ordered the merchandise, in which the card reader device includes reading means for reading information out of a card issued by the settling organization, and information transmitting means for transmitting the information on this settlement card and information on a price for the merchandise to the server of the settling organization through the wireless communication line; meanwhile, the server of the settling organization includes information receiving means for receiving the information on the settlement card and the information on the price for the merchandise from the portable card reader device through the wireless communication line, credit inquiring means for performing a credit inquiry concerning the consumer based on the received information on the settlement card and information for judging validity of the given settlement card, settling means for settling the price for the merchandise in accordance with a result of this credit inquiry and received information on the price for the merchandise, and result transmitting means for transmitting the result of this credit inquiry to the portable card reader device through the wireless communication line; and meanwhile, the portable card reader device further includes result receiving means for receiving the result of the credit inquiry from the server of the settling organization through the wireless communication line, and issuing means for issuing a receipt based on the received result of the credit inquiry and the information on the price for the merchandise.

Moreover, the gist includes the system in which the server of the settling organization includes transferring means for transferring a money amount calculated by deducting a commission concerning settlement from the price for the merchandise to a server of a financial institution which performs settlement on behalf of the home delivery contractor.

Moreover, the gist includes the system in which the server of the financial institution performing the settlement on behalf of the home delivery contractor includes transferring means for transferring a money amount calculated by deducting commission concerning home delivery from the money amount transferred from the server of the settling organization to a server of a financial institution which performs settlement on behalf of a seller.

Moreover, the gist includes the system in which the server of the settling organization includes deleting means for deleting the information of the settlement card being received from the portable card reader device after obtaining the result of the credit inquiry.

Moreover, the gist includes the system in which the portable card reader device includes deleting means for deleting the information of the settlement card of the consumer after obtaining the result of the credit inquiry.

Moreover, the gist includes the system in which the settling organization is any of a credit card company and a financial institution, and the settlement card is any of a credit card issued by the credit card company and a debit card issued by the financial institution.

BEST MODES FOR CARRYING OUT THE INVENTION

Embodiments of the present invention will be described below with reference to the drawings.
(First Embodiment)

Figure 1:
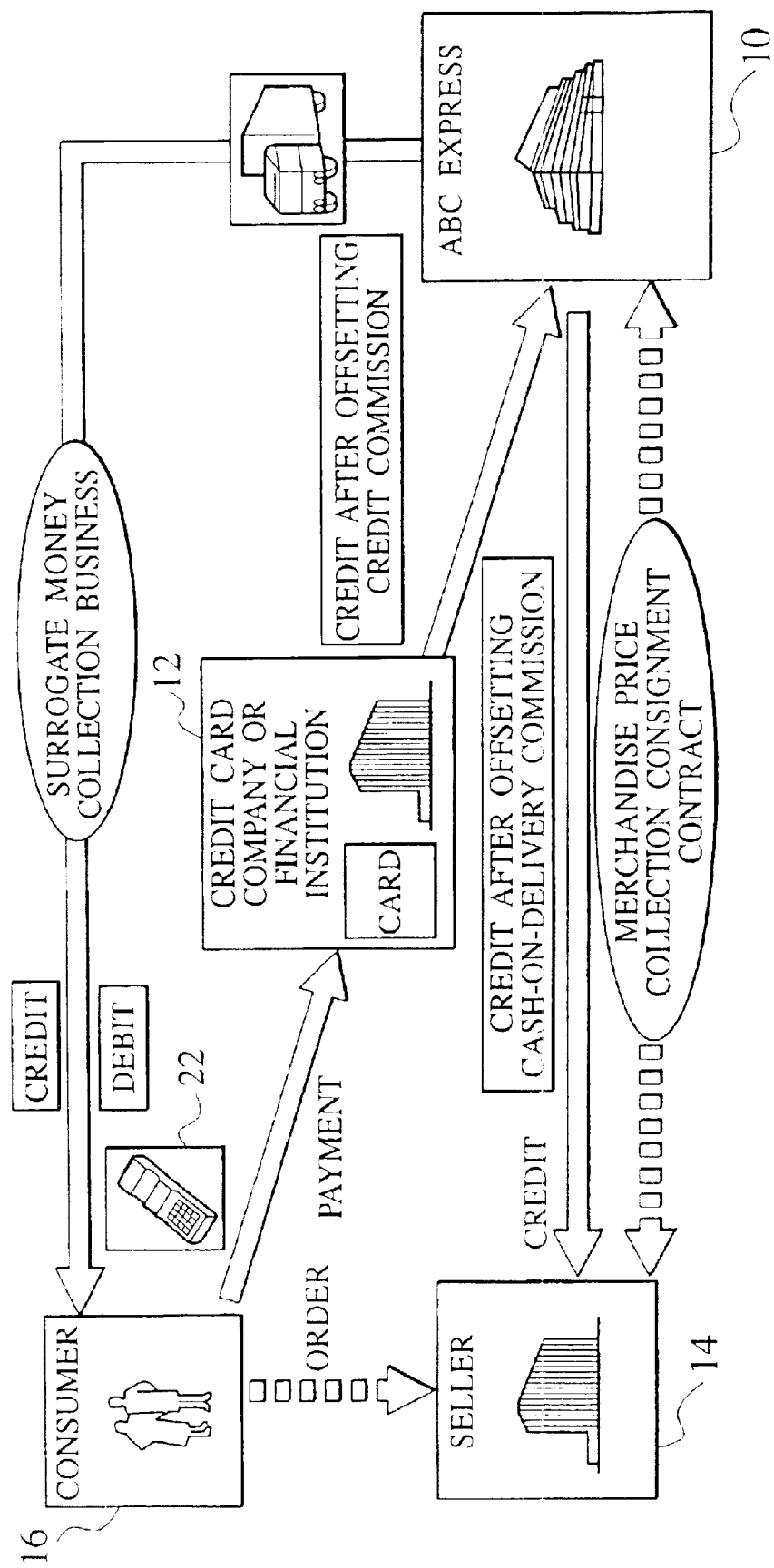
FIG. 1 is a flowchart of a pay-by-card system for a home delivery service according to a first embodiment of the present invention.
Figure 2:
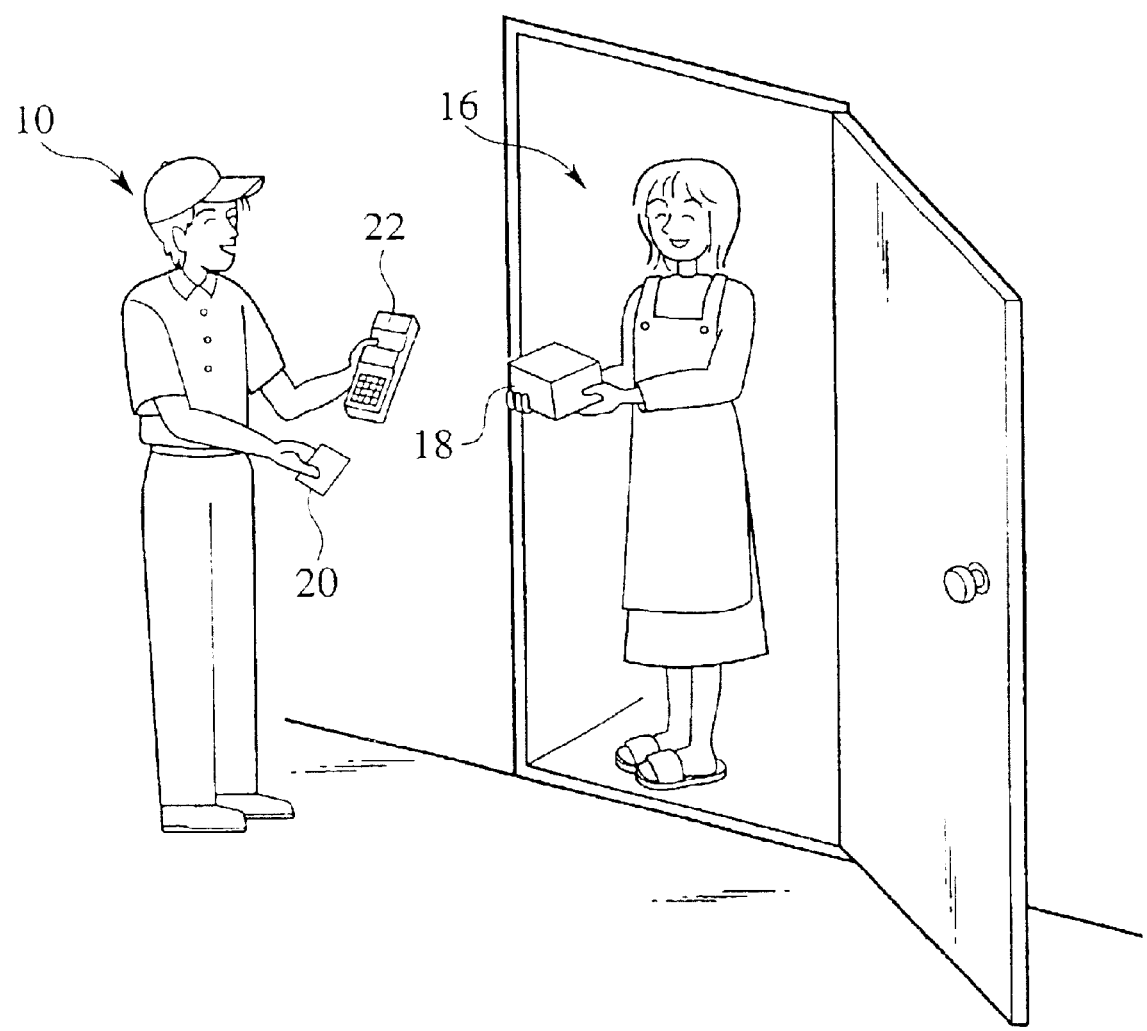
FIG. 2 is a schematic explanatory view of part of the pay-by-card system according to the first embodiment of the present invention.

FIG. 1 and FIG. 2 are views showing a pay-by-card system for a home delivery service according to a first embodiment of the present invention.

As shown in FIG. 1, a home delivery contractor 10 enters into an affiliation contract with a credit card company 12 beforehand. Moreover, the home delivery contractor 10 enters into a merchandise price collection consignment contract beforehand with a merchandise seller 14 either of a corporation or an individual who opens a shop in an Internet shopping mall.

Then, if a consumer 16 finds merchandise 18 (see FIG. 2) that the consumer 16 wishes to purchase at the seller 14 who has opened the shop in the Internet shopping mall established on the Internet, for example, then the consumer 16 specifies and orders the merchandise 18. Then the merchandise seller 14 makes a request to the home delivery contractor 10, with whom the merchandise seller 14 has entered into the merchandise price collection consignment contract, for home delivery to deliver the ordered merchandise 18 to the home of the consumer 16.

In this way, as shown in FIG. 2, the home delivery contractor 10 delivers the merchandise 18 to the home of the consumer 16 who ordered the merchandise 18.

Then, the consumer 16 hands a credit card 20, owned by the consumer 16, of the credit card company 12 with whom the home delivery contractor 10 has entered into the affiliation contract, to the home delivery contractor 10 while receiving the merchandise 18 from the home delivery contractor 10.

Then, the home delivery contractor 10 inserts the credit card 20 into a small portable card reader device 22 which he is carrying on site, so as to allow the portable card reader device 22 to read card information recorded on this card, such as an authentication number (a membership number), an expiration date, and the like. Then, the contents of the card record read by the portable card reader device 22 are sent to the credit card company 12 through a communication line such as a telephone line, the Internet, or a wireless line, and a credit inquiry takes place and the price for the delivered merchandise 18 is settled if no problems exists.

When payment of the price for the merchandise 18 is thus completed, the home delivery contractor 10 returns the credit card 20 to the consumer 16.

Accordingly, if the consumer 16 owns the credit card 20, the consumer 16 can enjoy shopping without having to prepare cash equivalent to the price for the merchandise 18 in advance while also being safe since such preparation of cash is not necessary.

On the other hand, for the home delivery contractor 10 since it is not necessary to pass change in such an instance that the consumer 16 passed cash which is more than the price for the merchandise 18, an increase in efficiency of delivery work can be attained. Moreover, since cash management of the received merchandise price and management of change become unnecessary, a risk of loss or theft of the cash also disappears.

Here, as shown in FIG. 1, of the price for the merchandise 18 paid to the credit card company 12, the money amount calculated by offsetting a credit commission to the credit card company 12 will be credited to the home delivery contractor 10, and then the money amount calculated by offsetting a home delivery commission to the home delivery contractor 10 will be credited to the merchandise seller 14.

Note that a settlement contract may be agreed with another settling organization such as a credit loan company or a financial institution instead of the credit card company 12.

(Second Embodiment)

In the pay-by-card system for a home delivery service according to a second embodiment of the present invention, the home delivery contractor 10 is assumed to be entered into a comprehensive affiliation contract with credit card companies 12 and with credit loan companies or financial institutions collectively as a plurality of settling organizations beforehand. Note that other parts of the constitution are identical to the constitution shown in the first embodiment; accordingly, description thereof will be omitted.

Therefore, when the consumer 16 does shopping in the Internet shopping mall established on the Internet, for example, and there is merchandise 18 that the consumer 16 wishes to purchase at the seller 14 who is an affiliated shop in the Internet shopping mall, then the consumer 16 applies for the merchandise 18 on a screen of a PC.

Then, there appears a selection screen for selecting either credit card settlement or cash-on-delivery settlement as a method of settling the price for the merchandise 18. At this point, the consumer 16 selects the cash-on-delivery settlement and then selects the home delivery contractor 10. In such a case as well, since the home delivery contractor 10 is entered into the affiliation contract with the plurality of credit card companies 12, the consumer 16 can use the credit card 20 he owns at the cash-on-delivery point if he desires credit settlement.

Therefore, the consumer 16 does not have to re-select another home delivery contractor 10 on the PC, with whom the credit card company 12 issuing the credit card owned by the consumer 16 is entered into a contract for an affiliated store, whereby the consumer 16 can specify the home delivery contractor 10 that the consumer 16 uses everyday so as to have certain delivery of the merchandise 18.

Note that other operations and effects are identical to those described in the first embodiment; accordingly, description thereof will be omitted.

Moreover, description has been made in this embodiment regarding the case of performing settlement of the price for the merchandise with the credit card by using the credit company 12. However, it is needless to say that the credit loan company may be also used.

In addition, description has been made in this embodiment regarding the case of performing settlement of the price for the merchandise by using the credit card 20. However, a debit card may be also used. When the debit card is used, the contents recorded in the card being read by the portable card reader device 22 are transmitted to the affiliated financial institution through the communication line and subjected to a credit inquiry, and the price for the delivered merchandise 18 is settled in one lump sum when no problems exist.

Moreover, in the embodiments of the present invention, the home delivery service refers to the act in which a third-party freight forwarder delegated by the seller of the merchandise delivers this merchandise to the home of the consumer.

(Third Embodiment)

Figure 3:
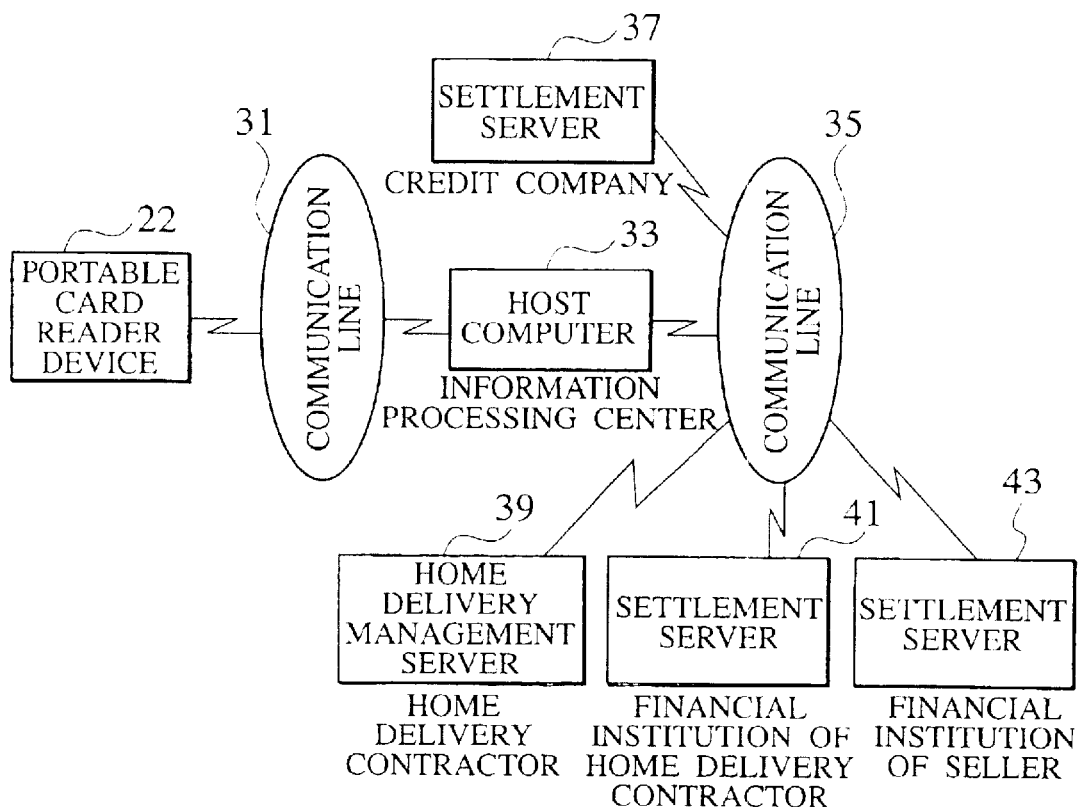
FIG. 3 is an overall view showing a pay-by-card system for a home delivery service according to a third embodiment of the present invention.

FIG. 3 is an overall view showing a pay-by-card system for a home delivery service according to a third embodiment of the present invention. Note that the third embodiment of the present invention refers to detailed description of the pay-by-card system for a home delivery service according to the first embodiment shown in FIG. 1 and FIG. 2.

As shown in FIG. 3, the portable card reader device 22 carried by the home delivery contractor is connectable to a communication line 31 such as a telephone line, the Internet, or a wireless communication line. Moreover, one of communication interfaces (not shown) of a host computer 33 installed at an information processing center is connected to this communication line 31. In addition, the other communication interface (not shown) of this host computer 33 is connected to a communication line 35 such as a telephone line or the Internet. Moreover, a settlement server 37 installed at a credit card company, a home delivery management server 39 installed at a home delivery contractor, a settlement server 41 installed at a financial institution which has entered into a settlement contract with this home delivery contractor, and a settlement server 43 installed at a financial institution which has entered into a settlement contract with a seller of merchandise, are connected to this communication line.

Figure 4:
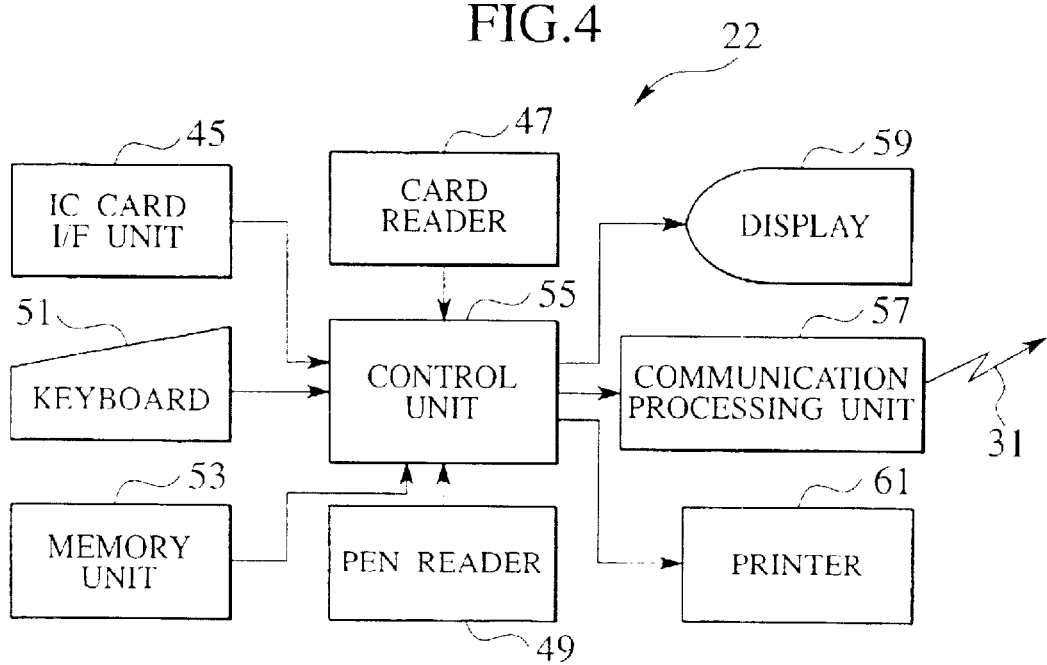
FIG. 4 is a block diagram of a portable card reader device.

Next, as shown in FIG. 4, the portable card reader device 22 is composed of an IC card I/F (interface) unit 45, a card reader 47, a pen reader 49, a keyboard 51, a memory unit 53, a control unit 55, a communication processing unit 57, a display 59, and a printer 61.

An IC card used for electronic money can be connected to the IC card I/F unit 45. The card reader 47 reads magnetic information recorded on a credit card, such as an authentication number, an expiration date, the name of the credit card company and the like. The pen reader 49 reads a tracking number out of a bar code written on a tag. The keyboard 51 inputs a money amount for the merchandise, an authentication number, and merchandise identification number.

The memory unit 53 includes an internal RAM for storing in advance a terminal number unique to each portable card reader device 22 and for storing control data. The control unit 55 includes an internal timer for clocking date and hour, and controls the respective units provided in the portable card reader device. The communication processing unit 57 performs communication of information with the host computer 33 through the communication line 31. The display 59 displays inputted contents and messages. The printer 61 prints a receipt upon completion of settlement by card.

Then, a control program is read out of the memory unit 53 into the control unit 55 by turning on a power switch (not shown) provided on the portable card reader device 22, and operation guidance is displayed on the display 59, for example. Accordingly, the home delivery contractor swipes a credit card through the card reader 47 to read the card data out, and the money amount for the merchandise representing the price for the merchandise, and the merchandise identification number are inputted with the keyboard. Next, the tracking number is read out of the bar code by use of the pen reader 49, and the authentication number is inputted with the keyboard 51. Thereafter, the terminal identification number of the portable card reader device being stored in the memory unit 53 in advance is read out. Then, the authentication number, the expiration date, the money amount for the merchandise, the merchandise identification number, the tracking number, and the authentication number are formed into a batch of terminal-collected information, and then the terminal-collected information is transmitted from the communication processing unit 57 to the host computer 33 installed at the information processing center through the communication line 31. Then, when availability information is received from the host computer through the communication processing unit 57, the printer 61 achieves the function of printing a receipt with the tracking number of the merchandise, the credit card company, the money amount for the merchandise, and the like.

Figures 5, 6:
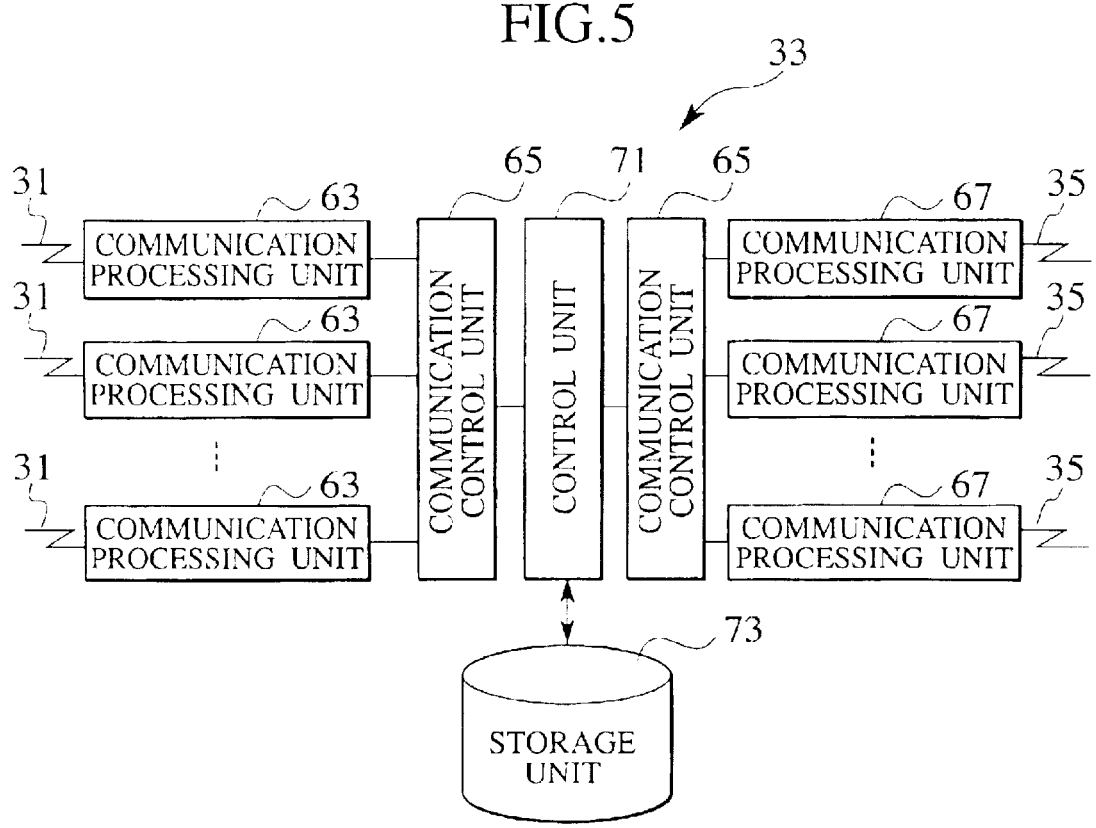
FIG. 5 is a block diagram of a host computer.
FIG. 6 is a view showing contents of storage in a storage unit provided on the host computer.

Next, as shown in FIG. 5, the host computer 33 is composed of communication processing units 63, a communication control unit 65, communication processing units 67, a communication control unit 69, a control unit 71, and a storage unit 73.

The communication processing units 63 perform communication of information among a plurality of portable card reader devices 22 through a plurality of communication lines 31. The communication control unit 65 controls the plurality of communication processing units 63. The communication processing units 67 perform communication of information among the plurality of servers 37, 39, 41 and 43 through a plurality of communication lines 35. The communication control unit 69 controls the plurality of communication processing units 67. The control unit 71 includes an internal timer for clocking date and hour, and controls the respective units provided in the host computer. The storage unit 73 stores transaction information, card information, and terminal information collectively as a database.

Here, as shown in FIG. 6, in the database stored in the storage unit 73, a tracking number representing a management number of merchandise, a money amount for the merchandise, classification of the merchandise, and the like are stored collectively as the transaction information, meanwhile, credit card company information and a card number (which is only stored temporarily) are stored collectively as the card information, and a terminal identification number of a portable card reader device distributed to a home delivery contractor is stored as the terminal information.

Moreover, when the terminal-collected information from the portable card reader device 22 is received by the communication processing unit 63 through the communication line 31, the control unit 71 stores this terminal-collected information into the database of the storage unit 73, and transmits a request for a credit check with the attached of the authentication number and the expiration date of the relevant consumer from the communication processing unit 67 to the settlement server 37 installed at the credit card company through the communication line 35.

Thereafter, when confirmation information from the settlement server 37 installed at the credit card company is received by the communication processing unit 67, the control unit 71 stores either the availability information or unavailability information contained in this confirmation information as the card information corresponding to the relevant tracking number in the database, and then transmits this confirmation information from the communication processing unit 63 to the portable card reader device 22 through the communication line 31.

Simultaneously, the control unit 71 deletes the authentication number of the credit card, which is stored in the database, provided in the storage unit 73. In this way, since the authentication number of the credit card being temporarily stored in the storage unit 73 is deleted, it is possible to prevent leakage of important personal information.

Furthermore, at a predetermined time arranged between the credit card company and the home delivery contractor for transferring the contents of the database, the control unit 71 transfers the contents of storage accumulated in the database of the storage unit 73 from the communication processing unit 67 to the home delivery management server 39 installed at the home delivery contractor through the communication line 35. Here, the control unit 71 performs the following functions of: reading the card information on the database of the storage unit 73; reading the money amount for the merchandise (the price for the merchandise) in the transaction information when the availability information is contained in the confirmation information; and transmitting a money amount (A), which is calculated by deducting a credit commission from the money amount for the merchandise, to the settlement server 41 installed at the financial institution which has entered into the settlement contract with the home delivery contractor.

Figures 7, 8:
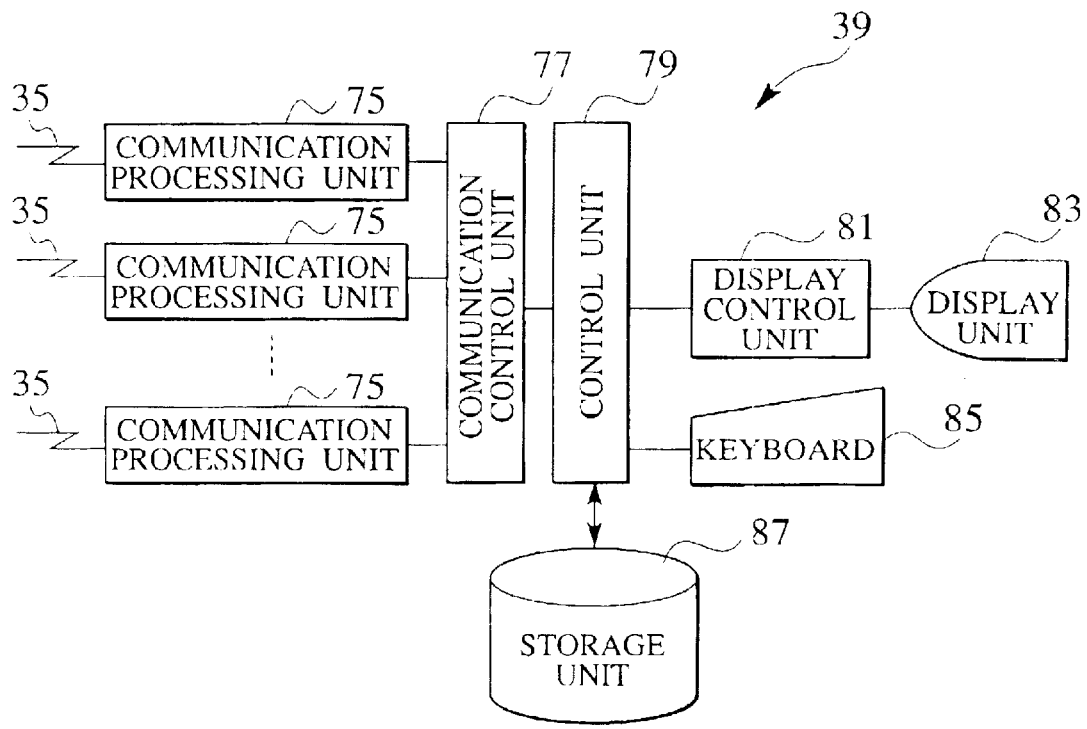
FIG. 7 is a block diagram of a home delivery management server.
FIG. 8 is a view showing contents of storage in a storage unit provided on the home delivery management server.

Next, as shown in FIG. 7, the home delivery management server 39 is composed of communication processing units 75, a communication control unit 77, a control unit 79, a display control unit 81, and a storage unit 87.

The communication processing units 75 perform communication of information with the host computer 33 or the settlement server 41 installed at the financial institution which has entered into the contract with the home delivery contractor through the plurality of communication lines 35. The communication control unit 77 controls the plurality of communication processing units 75. The control unit 79 includes an internal timer for clocking date and hour, and controls the respective units provided in the home delivery management server 39. The display control unit 81 displays the contents of communication of information exchanged with either the host computer 33 or the settlement server 41, and the contents stored in the storage unit 87 onto a display unit 83. The storage unit 87 stores the transaction information, the card information, the terminal information, and account information collectively as a database.

Here, as shown in FIG. 8, in the database stored in the storage unit 73, the tracking number representing the management number of the merchandise, the money amount for the merchandise, the classification of the merchandise and the like are stored collectively as the transaction information, and the credit card company information is stored as the card information. Moreover, the terminal identification number of the portable card reader device distributed to the home delivery contractor is stored in this database as the terminal information, and the contents of the transaction and a deposited amount are stored collectively as the account information.

Moreover, when the contents of storage in the database are received from the host computer 33 through the communication processing unit 75, the control unit 79 stores the received information into the database of the storage unit 87. Moreover, at a predetermined time for completion of money transfer arranged between the credit company and the home delivery contractor, a request for inquiring an account balance is transmitted to the settlement server 41 of the financial institution which has entered into the settlement contract with the home delivery contractor. Then, the account information received from the settlement server 41 of the financial institution is stored so as to correspond to the tracking number in the database of the storage unit 87. Moreover, the control unit 87 performs the following functions of: reading a deposited amount (A) out of the account information of the database when there is a credit from the credit card company in the money amount (A) for the merchandise to the account information corresponding to each tracking number stored in the database; and transmitting a money amount (B), which is calculated by deducting a home delivery commission from this deposited amount (A), to the settlement server 43 installed at the financial institution which has entered into the settlement contract with the seller.

Figure 9:
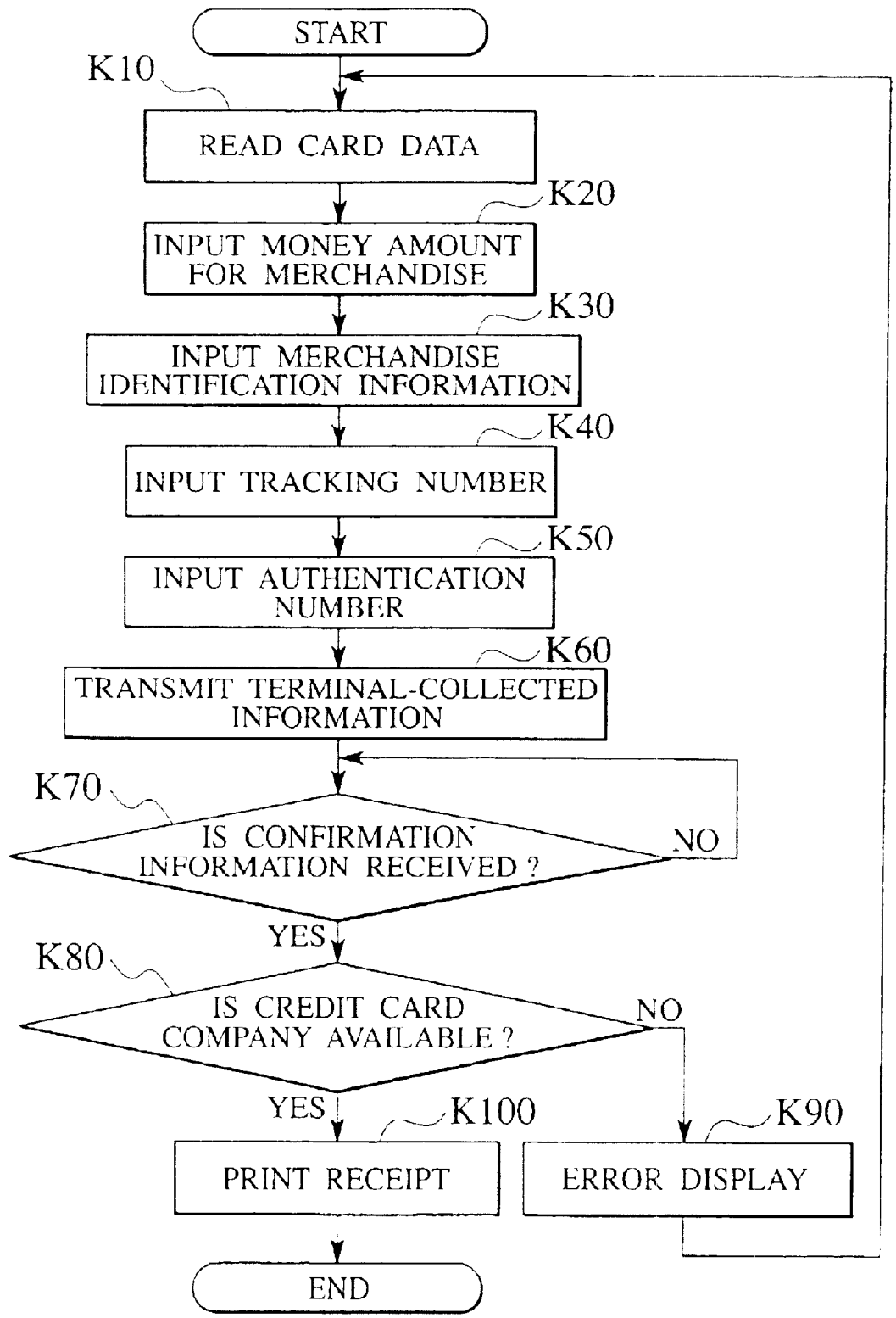
FIG. 9 is a flowchart showing an operation of the portable card reader device.
Figure 10:
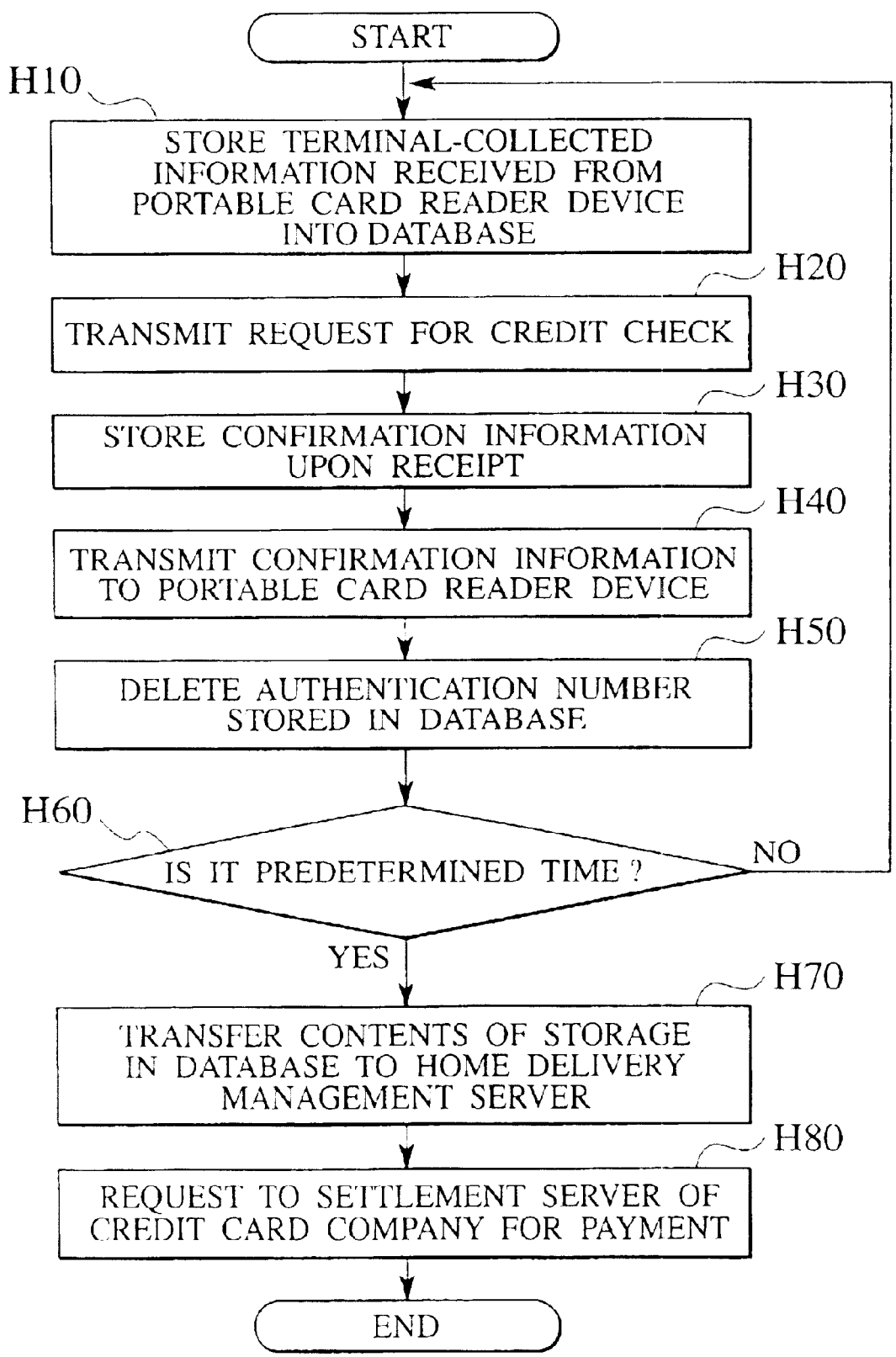
FIG. 10 is a flowchart showing an operation of the host computer.
Figure 11:
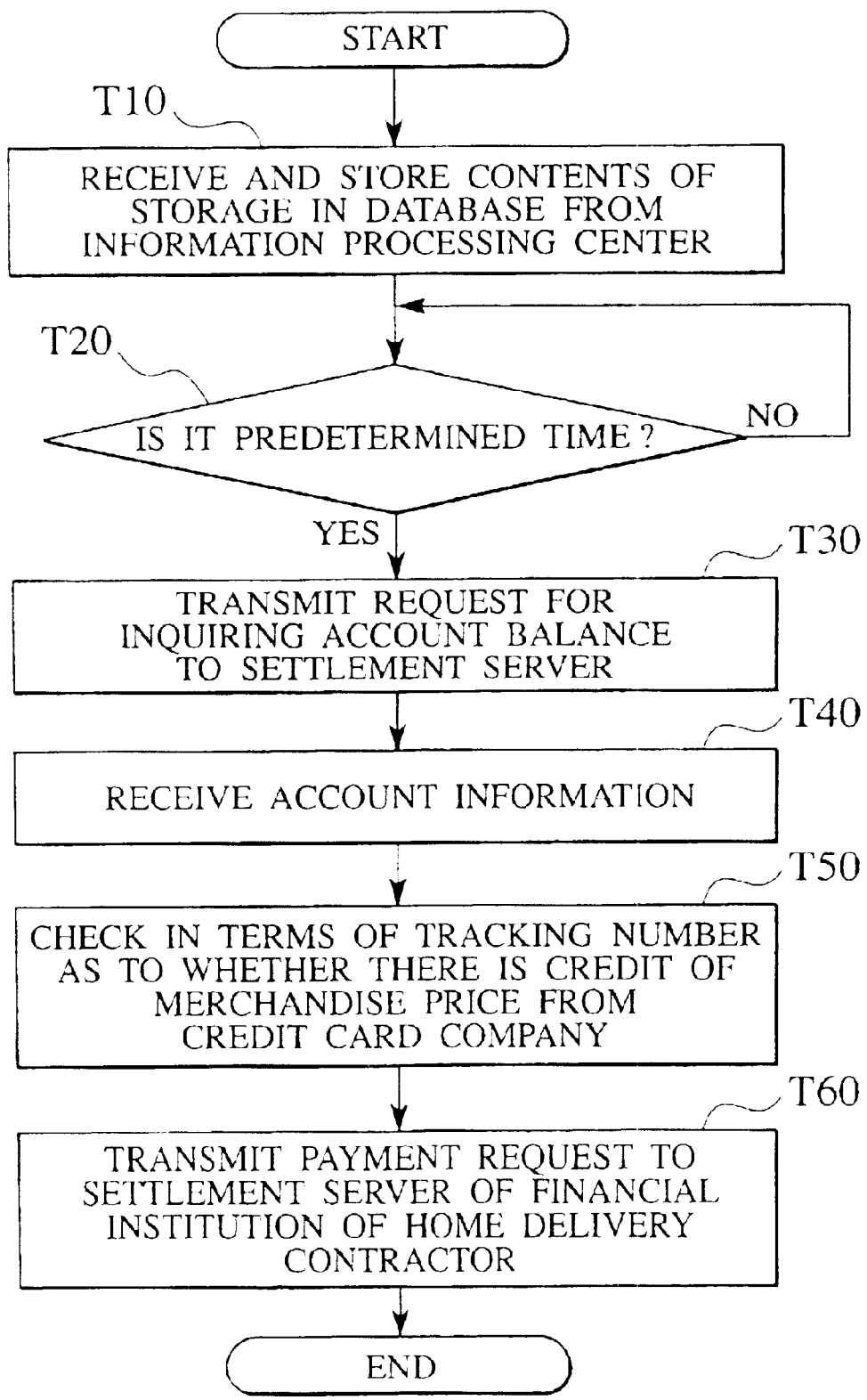
FIG. 11 is a flowchart showing an operation of the home delivery management server.
Figure 12:
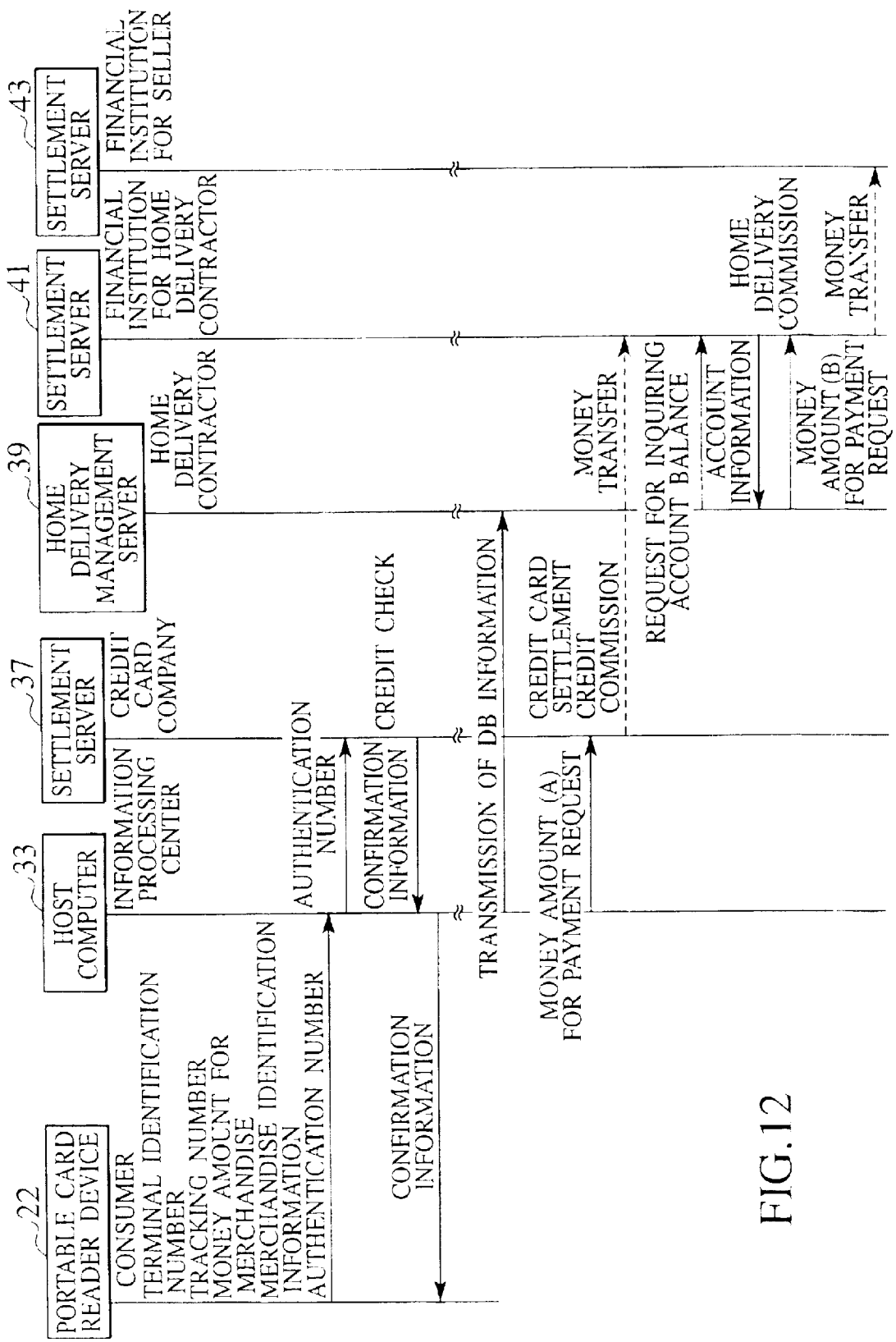
FIG. 12 is a sequence chart showing operations of the pay-by-card system for a home delivery service according to the third embodiment of the present invention.

Next, description will be made regarding operations of the pay-by-card system for a home delivery service according to the third embodiment of the present invention with reference to flowcharts shown in FIG. 9 to FIG. 11 and a sequence chart shown in FIG. 12. Note that the flowchart of the portable card reader device shown in FIG. 9 is stored in the control unit 55 as a program. Moreover, the flowchart of the host computer shown in FIG. 10 is stored in the control unit 71 as a program. Furthermore, the flowchart of the home delivery management server shown in FIG. 11 is stored in the control unit 79 as a program.

Similar to the first embodiment, in the third embodiment as well the home delivery contractor 11 enters into an affiliation contract with the credit card company 12 beforehand. Moreover, the home delivery contractor 10 enters into a merchandise price collection consignment contract with the merchandise seller 14 either of a corporation or an individual beforehand.

Moreover, if the consumer 16 specifies and orders with the seller 14 the merchandise 18 that the consumer 16 wishes to purchase, for example, then the merchandise seller 14 makes a request to the home delivery contractor 10, with whom the merchandise seller 14 has entered into the merchandise price collection consignment contract for home delivery, to deliver the ordered merchandise 18 to the home of the consumer 16.

In this way, as shown in FIG. 2, the home delivery contractor 10 delivers the merchandise 18 to the home of the consumer 16.

Then, the consumer 16 hands the credit card 20, owned by the consumer 16, of the credit card company 12 with whom the home delivery contractor 10 has entered into the affiliation contract, to the home delivery contractor 10 while receiving the merchandise 18 from the home delivery contractor 10.

Then, the home delivery contractor 10 inserts the credit card 20 into the small portable card reader device 22 having the portable card reader device 47 which he is carrying on site, allowing the information recorded on the card to be read.

Now, with reference to FIG. 9, in Step K10, the card reader 47 reads the card information including the authentication number, the expiration date and the like for identifying the member recorded on the card 20, and the card information is temporarily stored in the internal RAM provided in the memory unit 53 through the control unit 55.

Then, in Step K20, as the home delivery contractor 10 inputs the money amount for the merchandise with the keyboard 51, this money amount for the merchandise is temporarily stored from the control unit 55 into the internal RAM of the memory unit 53.

Then, in Step K30, as the home delivery contractor 10 inputs with the keyboard the merchandise identification number for identifying the merchandise, such as the price for the merchandise or a transportation charge 51, this merchandise identification number is temporarily stored from the control unit 55 into the internal RAM of the memory unit 53.

Then, in Step K40, as the home delivery contractor 10 reads the tracking number of the merchandise out of the bar code written on part of the tag by use of the pen reader 49, this tracking number is temporarily stored from the control unit 55 into the internal RAM of the memory unit 53.

Then, in Step K50, as the home delivery contractor 10 inputs with the keyboard 51 the authentication number shown on the card 20, this authentication number is temporarily stored from the control unit 55 into the internal RAM of the memory unit 53.

Then, in Step K60, the control unit 55 reads the terminal identification number of the portable card reader device 22, which is stored in the memory unit 53 in advance. In addition, the control unit 55 respectively reads the card information such as the authentication number and the expiration date, the money amount for the merchandise, the merchandise identification number, the tracking number and the authentication number which have been temporarily stored in the internal RAM, and then forms these pieces of information into a batch of terminal-collected information. Then, the control unit 55 transmits the terminal-collected information to the host computer 33 installed at the information processing center through the communication line 31.

Moving to FIG. 10, the control unit 71 of the host computer 33, which received the terminal-collected information from the portable card reader device 22 through the communication line 33, stores this terminal-collected information in the database of the storage unit 73 in Step H10 as shown in FIG. 6.

Then, in Step H20, the request for a credit check with the attached authentication number and the expiration date of the consumer is transmitted to the settlement server 37 installed at the credit card company through the communication line 35.

The settlement server 37 installed at the credit company, which receives the request for a credit check from the host computer 33, searches and compares as to whether or not the authentication number and the expiration date attached to this request for a credit check matches with the authentication number allotted to the consumer in order to judge validity of the given credit card being stored in a database (not shown) provided in its own server, whereby the settlement server 37 judges as to whether or not this consumer has a status where the consumer is currently entered into a credit contract with the relevant credit card company and the credit card is usable. Then, the settlement server 37 generates the confirmation information containing the availability information if the credit contract concerning this consumer is valid. On the contrary, if the credit contract concerning this consumer is not valid, then the settlement server 37 generates the confirmation information (the result of the credit inquiry) containing the unavailability information. Thereafter, the settlement server 37 returns the confirmation information thus generated back to the host computer 33.

In Step H30, the control unit 71 of the host computer 33, which received the confirmation information from the settlement server 37 installed at the credit card company, stores either the availability information or the unavailability information contained in this confirmation information as the card information corresponding to the relevant tracking number in the database.

Then, in Step H40, the host computer 33 transmits this confirmation information to the portable card reader device 22 through the communication line 31. Simultaneously, in Step H50, the control unit 71 deletes the authentication number of the credit card stored in the database provided in the storage unit 73, and then the process goes to Step H60.

As a result, because the authentication number of the credit card temporarily stored in the storage unit 73 is deleted after obtaining the result of the credit inquiry it is possible to prevent leakage of important personal information on the consumer.

In this way, if the host computer 33 installed at the information processing center receives the authentication number of the consumer and the information on the money amount for the merchandise through the communication line 31 by use of the portable card reader device 22 carried by the home delivery contractor and the host computer 33 transmits this authentication number to the settlement server 37 of the credit card company which performs settlement on behalf of the consumer, and if the host computer 33 receives the confirmation information indicating availability with this credit card company from the settlement server 37 of the credit card company, then the host computer 33 transmits this confirmation information to the portable card reader device 22. Thus, it is possible to carry out the credit inquiry concerning the card which is read by the portable card reader device 22.

Moving to FIG. 9, in Step K70, the portable card reader device 22 stands by until the portable card reader device 22 receives the confirmation information from the host computer 33. Here, the portable card reader device 22 goes to Step K80 upon receipt of the confirmation information from the host computer 33, and judges as to whether or not the credit card company is available based on this confirmation information. That is, the credit card company is available if the availability information is contained in the confirmation information. In this case, the process goes to Step K100. On the contrary, the credit card company is not available if the unavailability information is contained in the confirmation information. In this case, the process goes to Step K90.

When the credit card company is not available, in Step K90, the control unit 55 reads message information such as "This credit card company is not available" out of the memory unit 53, and displays an error message on the display 59. Simultaneously, the control unit 55 deletes the card information, such as the authentication number and the expiration of the consumer, which has been temporarily stored in the internal RAM of the memory unit 53. Then, the process goes back to Step K10 and the above-described processing is repeated.

On the other hand, when the credit card company is available, in Step K100, the control unit 55 reads the tracking number of the merchandise, the credit card company, the money amount for the merchandise, and the like out of the memory unit 53. Then, the control unit 55 generates receipt information representing completion of settlement of the merchandise, by attaching the time read out of the timer to the above data as the date and time of delivery. This receipt information is outputted to the printer 61, whereby a receipt is printed out.

Simultaneously, the control unit 55 deletes the card information of the consumer, such as the authentication number and the expiration, which has been temporarily stored in the internal RAM of the memory unit 53. Then, the process of the portable card reader device 22 is finished. The printed receipt is torn from the printer 61 by the home delivery contractor and is passed to the consumer.

In this way, the authentication number of the consumer is read out of the credit card issued by the credit company which performs settlement on behalf of the consumer, and information on amount of the money for the merchandise ordered by the consumer is also inputted. Then, when the authentication number of the consumer and the information on the money amount for the merchandise are transmitted to the host computer 33 of the information processing center through the communication line, and when the information indicating availability of the credit card company is received from the host computer 33 of the information processing center, the receipt representing completion of settlement of the merchandise is printed out of the printer 61. For this reason, it is possible to settle the price for the merchandise delivered by the home delivery service with the credit card. As a result, the consumer who ordered the merchandise can purchase the delivered merchandise on credit without having to prepare the cash equivalent to the price for the merchandise to be delivered, enjoy shopping, and a contribution can be made to the convenience and safety of the consumer.

Moreover, in the portable card reader device 22, the authentication number of the credit card being temporarily stored in the storage unit 73 is deleted after obtaining the result of the credit inquiry. Accordingly, it is possible to prevent leakage of the important personal information on the consumer.

Here, in Step H60, the control unit 71 of the host computer installed at the information processing center judges as whether or not the time being read out of the timer is the predetermined time arranged between the credit card company and the home delivery contractor for transferring the contents of the database. Then, the process goes back to Step H10 until the predetermined time, and the above-described processing is repeated.

When it is the predetermined time, in Step H70, the contents of storage accumulated in the database of the storage unit 73 are transferred to the home delivery management server 39 installed at the home delivery contractor through the communication line 35.

Then, in Step H80, the control unit 71 reads the card information on the database of the storage unit 73, and judges as to whether or not the availability information is contained in the confirmation information. Thereafter, when the availability information is contained therein, the control unit 71 reads the money amount for the merchandise (the price, for the merchandise) in the transaction information, then transmits the money amount (A) calculated by deducting the credit commission from this money amount for the merchandise to the settlement server 41 installed at the financial institution which has entered into the settlement contract with the home delivery contractor, and then the processing is finished.

As a result, the credit commission will be credited to the credit card company by the end of a predetermined due date, and further, monthly payment of the price for the merchandise will be credited every month. Moreover, the money amount (A) is credited from the credit card company to the financial institution that has entered into the settlement contract with the home delivery contractor.

As described above, the host computer 33 returns the information on the money amount for the merchandise if the host computer 33 has received the confirmation information which indicates availability with this credit card company, from the settlement server 37 of the credit card company which performs the settlement on behalf of the consumer. Moreover, by transmitting a request of payment for the money amount for the merchandise from the credit card company to the settlement server 41 of the financial institution that performs the settlement on behalf of the home delivery contractor, the cash-on-delivery settlement of the merchandise can be carried out through the credit card company, and the price for the merchandise can be paid to the financial institution that performs the settlement on behalf of the home delivery contractor.

Moreover, the settlement server 37 of the credit card company which performs the settlement on behalf of the consumer transfers the money amount (A) calculated by deducting the commission concerning the settlement from the money amount for the merchandise to the financial institution which performs the settlement on behalf of the home delivery contractor. Accordingly, the credit card company can record the sale while settling the commission concerning the settlement.

Moving to FIG. 11, in Step T10, the control unit 79 of the home delivery management server 39 installed at the home delivery contractor stores the database storage contents received from the host computer 33 installed at the information processing center, into the database of the storage unit 87.

Then, in Step T20, judgment is made as to whether or not it is the predetermined time arranged between the credit card company and the home delivery contractor. Then, the process goes back to Step T20 until the predetermined time, and the above-described processing is repeated.

When it is the predetermined time, in Step T30, the request for inquiring an account balance is transmitted to the settlement server 41 of the financial institution which has entered into the settlement contract with the home delivery contractor.

Then, in Step T40, the home delivery management server 89 stores the account information received from the settlement server 41 of the financial institution so as to correspond to the tracking number in the database of the storage unit 87.

Then, in Step T50, the control unit 87 checks as to whether or not the money amount (A) has been credited for the merchandise from the credit card company with respect to the account information corresponding to each tracking number stored in the data base. Then, in Step T60, the deposited amount (A) in the account information of the database is read out when the money amount (A) has been credited for the merchandise from the credit card company, and the money amount (B) calculated by deducting the home delivery commission from this deposited amount (A) is transmitted to the settlement server 43 installed at the financial institution which has entered into the settlement contract with the seller, and then the processing is finished.

As a result, the money amount (B), that is, the money amount (B) calculated by deducting the credit commission and the home delivery commission from the money amount for the merchandise is credited to the financial institution which has entered into the settlement contract with the seller.

Note that description has been made in the third embodiment based on the example of performing the credit card settlement with the credit card issued by the credit card company, which is the settling organization that performs the settlement on behalf of the consumer. However, the settling organization may be other financial institutions such as a bank. In this case, the consumer can perform cash-on-delivery settlement in response to the delivered merchandise with a debit card issued by the financial institution. Here, in the case of settling by use of the debit card, the consumer is supposed to input a personal identification number which has been registered with the financial institution beforehand.

Meanwhile, in addition to the above-described credit card and the debit card, there are other individually inherent authentication media such as fingerprints and retinas. If image information is read from fingerprints or retinas and is registered with the settling organization beforehand, and if this image information is read with the portable card reader device 22 and the authentication processing is performed by the settling organization, then it is possible to specify an individual.

INDUSTRIAL APPLICABILITY

According to the present invention, the information on the settlement card for use in settlement by the consumer is read by the portable card reader device upon delivery of the merchandise to the consumer, then the contents thus read out are transmitted to the server of the settling organization which performs settlement through the communication line, and then the price of the merchandise is settled upon receipt of the result of a credit inquiry regarding the settlement card by the server of the settling organization. Accordingly, it is possible to settle the price of the merchandise delivered by the home delivery service with the card.

As a result, the consumer who ordered the merchandise can purchase the delivered merchandise without having to prepare the cash equivalent to the price for the merchandise to be delivered, enjoy shopping, and a contribution can be made to the convenience and safety of the consumer.

Moreover, the portable card reader device reads the information out of the settling card issued by the settling organization, and then transmits the information on this settlement card and the information on the price for the merchandise to the server of the settling organization through the communication line. Meanwhile, the server of the settling organization receives the information on the settlement card and the information on the price for the merchandise from the portable card reader device through the communication line, then performs the credit inquiry concerning the consumer based on the received information on the settlement card and the information for judging validity of the given settlement card, then settles the price for the merchandise in accordance with the result of this credit inquiry and the received information on the price for the merchandise, and then transmits the result of this credit inquiry to the portable card reader device. Then, the card reader device receives the result of the credit inquiry from the server of the settling organization through the communication line, and then issues the receipt in accordance with the received result of the credit inquiry and the information on the price for the merchandise. Accordingly, it is possible to settle the price for the merchandise delivered by the home delivery service with the card. As a result, the consumer who ordered the merchandise can purchase the delivered merchandise without having to prepare the cash equivalent to the price for the merchandise to be delivered, enjoy shopping, and a contribution can be made to the convenience and safety of the consumer.

Moreover, the server of the settling organization which performs the settlement on behalf of the consumer transfers the money amount calculated by deducting the commission concerning the settlement from the money amount for the merchandise to the server of the financial institution which performs the settlement on behalf of the home delivery contractor. Accordingly, the settling organization which performs the settlement on behalf of the consumer can record the sale while settling the commission concerning the settlement.

Moreover, the server of the financial institution which performs the settlement on behalf of the home delivery contractor transfers the money amount calculated by deducting the commission concerning the home delivery from the money amount transferred from the settling organization of the consumer to the server of the financial institution which performs the settlement on behalf of the seller. Accordingly, the server of the financial institution which performs the settlement on behalf of the home delivery contractor can record the sale while settling the commission concerning the home delivery.

Moreover, the server of the settling organization which performs the settlement on behalf of the consumer deletes the information on the settlement card received from the portable card reader device after obtaining the result of the credit inquiry. Accordingly, it is possible to prevent leakage of the important personal information on the consumer.

Moreover, the portable card reader device deletes the information on the settlement card of the consumer after obtaining the result of the credit inquiry. Accordingly, it is possible to prevent leakage of the important personal information on the consumer.

To the consumer who ordered the merchandise, the present invention provides excellent benefits in that the consumer can purchase the delivered merchandise without having to prepare the cash equivalent to the price for the merchandise to be delivered and thereby enjoy shopping, and that the present invention leads to convenience and safety for the consumer.

Moreover, to the home delivery contractor, the present invention provides excellent benefits in that the home delivery contractor can attain an increase in efficiency of delivery work because operations of passing change to the consumer and the like become unnecessary, and that cash management of the received price and management of the change become unnecessary.

Moreover, the present invention provides an excellent benefit in that the consumer does not have to re-select another home delivery contractor on the PC, and that the consumer can specify the home delivery contractor whom the consumer wishes to perform home delivery.

Moreover, the settling organization which performs the settlement on behalf of the consumer may be a credit card company or a financial institution, and the settlement card may be a credit card issued by the credit card company or a debit card issued by the financial institution. Accordingly, the consumer can perform credit card settlement with the credit card or cash-on-delivery settlement with the debit card.

As described above, the pay-by-card method and the pay-by-card system for a home delivery service according to the present invention is useful for settling the price of the merchandise in the event that the home delivery contractor delivers the merchandise to the consumer who ordered the merchandise, and is particularly suitable for settling the price of the merchandise with the card.

What is claimed is:

1. A pay-by-card method for a home delivery service which is a settling method for performing settlement of merchandise by exchanging information through a wireless communication line between a server of a settling organization and a portable card reader device carried by a home delivery contractor who delivers the merchandise to a consumer who has ordered the merchandise, comprising:

reading with the portable card reader device information out of a settlement card for use in settlement by the consumer upon delivery of the merchandise to the consumer, transmitting the information on this settlement card and information on a price for the merchandise to the server of the settling organization which performs settlement through the wireless communication line, receiving a result of a credit inquiry regarding the settlement card from the server of the settling organization, issuing a receipt including a tracking number of the merchandise and the money amount when the received result means the settlement card is usable, transmitting from a home delivery management server installed at a home delivery contractor a request for an account balance to a settlement server of a financial institution which has entered into the settlement contract with the home delivery contractor at a predetermined time, storing the account information received from the settlement server so as to correspond to the tracking number, reading a deposited amount out of the account information corresponding to each tracking number when there is a credit from a credit card company, and transmitting a money amount which is deducted a home delivery commission from the deposited amount to a settlement server installed at the financial institution which has entered into the settlement contract with the seller.

2. A pay-by-card method for a home delivery service which is a settling method for performing settlement of merchandise by exchanging information through a wireless communication line between a server of a settling organization and a portable card reader device carried by a home delivery contractor who delivers the merchandise to a consumer who has ordered the merchandise, reading from the card reader device information out of a card issued by the settling organization, and transmitting the information on this settlement card and information on a price for the merchandise to the server of the settling organization through the wireless communication line;

receiving from the server of the settling organization the information on the settlement card and the information on the price for the merchandise from the portable card reader device through the wireless communication line, performing a credit inquiry concerning the consumer based on the received information on the settlement card and information for judging validity of the given settlement card, setting the price for the merchandise in accordance with a result of the credit inquiry and received information on the price for the merchandise, transmitting the result of this credit inquiry to the portable card reader device through the wireless communication line, receiving at the portable card reader device the result of the credit inquiry from the server of the settling organization through the wireless communication line, and issuing a receipt including a tracking number of the merchandise and the money amount when the received result means the settlement card is usable;

transmitting from a home delivery management server installed at a home delivery contractor a request for inquiring an account balance to a settlement server of a financial institution which has entered into the settlement contract with the home delivery contractor at a predetermined time, storing the account information received from the settlement server so as to correspond to the tracking number, reading a deposited amount out of the account information corresponding to each tracking number when there is a credit from a credit card company, and transmitting a money amount which is deducted a home delivery commission from the deposited amount to a settlement server installed at the financial institution which has entered into the settlement contract with the seller.

3. The pay-by-card method for a home delivery service of claim 2, wherein the server of the settling organization transfers a money amount calculated by deducting a commission concerning settlement from the price for the merchandise to a server of a financial institution which performs settlement on behalf of the home delivery contractor.

4. The pay-by-card method for a home delivery service of claim 3, wherein the server of the financial institution performing the settlement on behalf of the home delivery contractor transfers a money amount calculated by deducting commission concerning home delivery from the money amount transferred from the server of the settling organization to a server of a financial institution which performs settlement on behalf of a seller.

5. The pay-by-card method for a home delivery of claim 1 or 2, wherein the server of the settling organization deletes the information of the settlement card being received from the portable card reader device after obtaining the result of the credit inquiry for preventing leakage of the personal information.

6. The pay-by-card method for a home delivery service of claim 1 or 2, wherein the portable card reader device deletes the information of the settlement card of the consumer after obtaining the result of the credit inquiry for preventing leakage of the personal information.

7. The pay-by-card method for a home delivery service of any one of claims 1 to 4, wherein the settling organization is any of a credit card company and a financial institution, and the settlement card is any of a credit card issued by the credit card company and a debit card issued by the financial institution.

8. A pay-by-card system for a home delivery service being a settling system for performing settlement of merchandise by exchanging information through a wireless communication line between a server of a settling organization and a portable card reader device carried by a home delivery contractor who delivers the merchandise to a consumer who has ordered the merchandise, the portable card reader device comprising:

reading means for reading information out of a settlement card for use in a settlement by the consumer upon delivery of the merchandise to the consumer;

a pen reader for reading a tracking number of the merchandise out of the bar code written on part of a tag;

transmitting means for transmitting the information on this settlement card and information on a price for the merchandise to the server of the settling organization which performs settlement through the wireless communication line;

receiving means for receiving a result of a credit inquiry regarding the settlement card from the server of the settling organization; and issuing means for issuing a receipt including the tracking number and the money amount when the received result means the settlement card is usable; said pay-by-card system further comprising:

a home delivery management server installed at a home delivery contractor comprising:

transmitting means for transmitting a request for inquiring an account balance to a settlement server of a financial institution which has entered into the settlement contract with the home delivery contractor at a predetermined time;

storing means for storing the account information received from the settlement server so as to correspond to the tracking number;

reading means for reading a deposited amount out of the account information corresponding to each tracking number when there is a credit from a credit card company; and transmitting means for transmitting a money amount which is deducted a home delivery commission from the deposited amount to a settlement server installed at the financial institution which has entered into the settlement contract with the seller.

9. A pay-by-card system being a settling system for performing settlement of merchandise by exchanging information through a wireless communication line between a server of a settling organization and a portable card reader device carried by a home delivery contractor who delivers the merchandise to a consumer who has ordered the merchandise, the card reader device comprising:

reading means for reading information out of a card issued by the settling organization;

a pen reader for reading a tracking number of the merchandise out of the bar code written on part of a tag; and information transmitting means for transmitting the information on this settlement card and information on a price for the merchandise to the server of the settling organization through the wireless communication line;

the server of the settling organization comprising:

information receiving means for receiving the information on the settlement card and the information on the price for the merchandise from the portable card reader device through the wireless communication line;

credit inquiring means for performing a credit inquiry concerning the consumer based on the received information on the settlement card and information for judging validity of the given settlement card;

settling means for settling the price for the merchandise in accordance with a result of this credit inquiry and received information on the price for the merchandise; and result transmitting means for transmitting the result of this credit inquiry to the portable card reader device through the wireless communication line; and the portable card reader device further comprising:

result receiving means for receiving the result of the credit inquiry from the server of the settling organization through the wireless communication line; and issuing means for issuing a receipt including the tracking number and the money amount when the received result means the settlement card is usable; said pay-by-card system further comprising:

a home delivery management server installed at a home delivery contractor comprising:

transmitting means for transmitting a request for inquiring an account balance to a settlement server of a financial institution which has entered into the settlement contract with the home deliver contractor at a predetermined time;

storing means for storing the account information received from the settlement server so as to correspond to the tracking number;

reading means for reading a deposited amount out of the account information corresponding to each tracking number when there is a credit from a credit card company; and transmitting means for transmitting a money amount which is deducted a home delivery commission from the deposited amount to a settlement server installed at the financial institution which has entered into the settlement contract with the seller.

10. The pay-by-card system for a home delivery service of claim 9, wherein the server of the settling organization comprises:

transferring means for transferring a money amount calculated by deducting a commission concerning settlement from the price for the merchandise to a server of a financial institution which performs settlement on behalf of the home, delivery contractor.

11. The pay-by-card system for a home delivery service of claim 10, wherein the server of the financial institution performing the settlement on behalf of the home delivery contractor comprises:

transferring means for transferring a money amount calculated by deducting commission concerning home delivery from the money amount transferred from the server of the settling organization to a server of a financial institution which performs settlement on behalf of a seller.

12. The pay-by-card system for a home delivery service of claim 8 or 9, wherein the server of the settling organization comprises:

deleting means for deleting the information of the settlement card being received from the portable card reader device after obtaining the result of the credit inquiry for preventing leakage of the personal information.

13. The pay-by-card system for a home delivery of claim 8 or 9, wherein the portable card reader device comprises:

deleting means for deleting the information of the settlement card of the consumer after obtaining the result of the credit inquiry for preventing leakage of the personal information.

14. The pay-by-card system for a home delivery service of any one of claims 8 to 11, wherein the settling organization is any of a credit card company and a financial institution, and the settlement card is any of a credit card issued by the credit card company and a debit card issued by the financial institution.

* * * * *

UNITED STATES PATENT AND TRADEMARK OFFICE
CERTIFICATE OF CORRECTION

PATENT NO.    : 6,848,615 B2
DATED         : February 1, 2005
INVENTOR(S)   : Yamagami It is certified that error appears in the above-identified patent and that said Letters Patent is hereby corrected as shown below:

<u>Title Page,</u>
Items [12] and [75], Inventors, should read as follows:
-- [12] UNITED STATES PATENT
      Yamagami et al.
  [75] Inventors:   Takayuki Yamagami, Kyoto, (JP)
                       Takahiko Kurisu, Tokyo (JP) --

Signed and Sealed this

Third Day of May, 2005

JON W. DUDAS
*Director of the United States Patent and Trademark Office*